(12) United States Patent
Ankori

(10) Patent No.: US 7,467,545 B2
(45) Date of Patent: Dec. 23, 2008

(54) METHOD AND DEVICE FOR MEASURING WATER CURRENTS

(76) Inventor: Yaron Ankori, 25 Yud Alef Behadar Street, Holon (IL) 58314

( * ) Notice: Subject to any disclaimer, the term of this patent is extended or adjusted under 35 U.S.C. 154(b) by 0 days.

(21) Appl. No.: 11/801,034

(22) Filed: May 9, 2007

(65) Prior Publication Data

US 2008/0276702 A1 Nov. 13, 2008

(51) Int. Cl.
*G01C 5/00* (2006.01)
(52) U.S. Cl. .................................. 73/170.29; 73/170.31
(58) Field of Classification Search .............. 73/170.29, 73/170.31
See application file for complete search history.

(56) References Cited

U.S. PATENT DOCUMENTS

| | | | | |
|---|---|---|---|---|
| 3,955,412 A | * | 5/1976 | Niskin | 73/170.29 |
| 4,545,243 A | * | 10/1985 | Niskin | 73/170.04 |
| 6,552,336 B1 | * | 4/2003 | Lloyd et al. | 250/306 |
| 6,586,748 B1 | * | 7/2003 | Lloyd et al. | 250/455.11 |
| 6,820,008 B1 | * | 11/2004 | van Smirren et al. | 702/2 |

FOREIGN PATENT DOCUMENTS

| | | | |
|---|---|---|---|
| GB | 2437619 A | * | 10/2007 |
| JP | 2004359081 A | * | 12/2004 |
| SU | 494692 A | * | 8/1976 |

* cited by examiner

*Primary Examiner*—Andre J Allen

(57) ABSTRACT

Fluid current measurement by means of resistance differentials in thermistor. Input parameters to micro-processor like fluid temperature, depth, change in electrical resistance, direction sensors. Output calculation of fluid current, current direction, temperature, danger level and recommended safe distance from the boat.

9 Claims, 1 Drawing Sheet

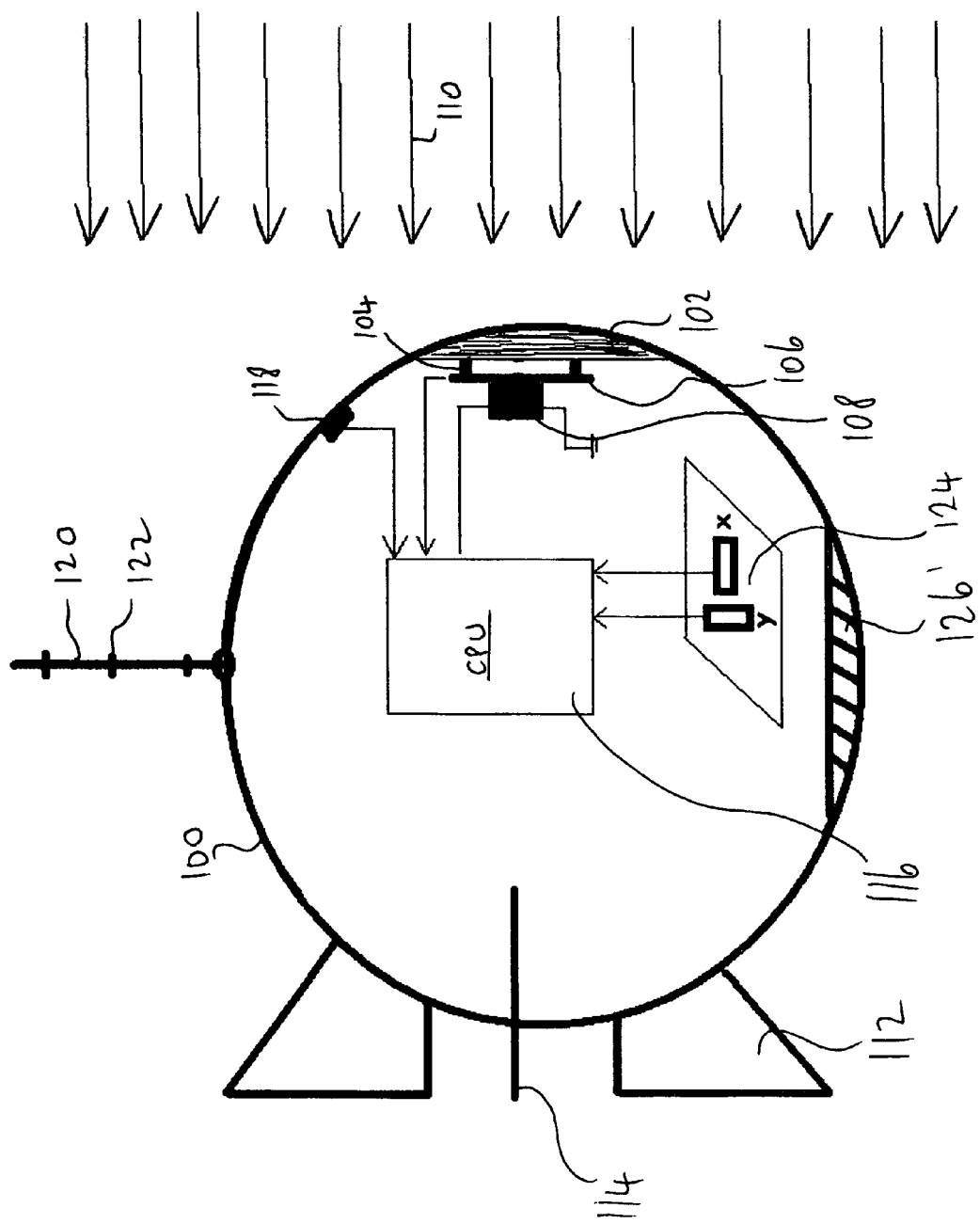

METHOD AND DEVICE FOR MEASURING WATER CURRENTS

FIELD OF THE INVENTION

This invention is in the field of fluid measurements and in particular marine measurements like force of current, direction of current together with recommendations regarding danger and safe distance from the base boat.

BACKGROUND OF THE INVENTION

The current force measuring device of this invention could have many applications whenever it is necessary to measure the current or force of flow of a fluid. In this document reference will be made generally to the use of this invention in the field of diving, whether for pleasure, sport, or professional use. Other uses could be military, fishing, surveying and exploring.

Until now the conventional method for measuring the flow of water current has been with the aid of propellers or similar mechanically or semi mechanically operated devices, including optical and dopler sound wave methods. The cost of prior art is high relative to the estimated cost of the present invention and the size and simplicity of use are also factors in the favor of the present invention.

SUMMARY OF THE INVENTION

It is to be understood that both the foregoing general description and the following detailed description present embodiments of the invention and are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

The present invention is a method and device to measure the current of flowing fluids and particularly suitable for providing divers with information relevant to them before starting a dive. This information includes the speed of the water flow, commonly known as the strength of the current, at what depth the speed measurement was taken, the water temperature, which direction the said water is flowing, the recommended distance the diver should keep between himself and the boat and a scale of danger based on these factors to inform divers of the degree of danger in the water at the measured depth.

The innovative method used to measure the strength of the current is based on the premise that a heated item, heated to a constant temperature, will cool quicker in a stronger water current than in a weaker one. The method used to measure this drop in temperature uses a thermistor.

A thermistor is a type of resistor used to accurately measure temperature changes and is registered as a U.S. Pat. No. 2,021,491 issued to Ruben. Negative temperature coefficient thermistors are often made from pressed disc or cast chip semiconductors. They work because raising the temperature increases the number of electrons able to move and carry charge in the conducting band. The more charge carriers that are available the more current a material can conduct. The hotter the temperature, the smaller the resistance to the flow of current. So a change from the constant temperature to a lower temperature will increase the resistance to the electrical current which is measured and recorded by the micro-processor to which the thermistor is attached. So the greater the water current, the lower the temperature of the heated conductor attached to the thermistor. This change of temperature will be recorded by the thermistor.

Other features of this device are a marked rope or cable for measurement of the depth below water surface level that these measurements take place. This could be a mechanical method of marking the cable attached to the device of this invention as it is lowered into the water. The depth could be read by the person on the boat reading the depth reading on the lowering cable.

The said device could also have wings or fins to assist its stabilization and help keep its direction constant relative to the flow of the water current. It would have probably at least two direction sensors whose co-ordinate readings could be fed into the microprocessor so that the direction of the water current flow would be known by calculating the direction of the said device from the sensor co-ordinates. A thermometer would also be connected to the micro-processor so that the water temperature will be added to the other data input. It is necessary to know the temperature of the water not only for the empirical value of the information for the divers but the effect of the water current flow on the heat conductor is affected by the water temperature. That is to say, the cooling affect of the water current on the heat conductor varies with different water temperatures. Therefore the water temperature has to be one of the factors of data input into the microprocessor in order to determine the water current velocity. The thermistor might carry out the thermometer function and measures also the temperature of the water, alternatively, the thermometer that measure the temperature of the water might be separated from the origin thermistor.

The said device would also have weights to keep its downward force greater than its tendency to float. There would be a software program to collect all the input data and convert the same into the output data required for the benefit of divers or others using this invention, for example fishermen.

Communication from the device under water could be by cable to the accompanying boat and then by infra red cellular phone or other methods of communication to the divers or to other persons wanting the information to their cellular phones, laptops, PDAs and the like. Alternatively the communication could be direct from the device to the user by at least one of the above mentioned methods.

BRIEF DESCRIPTION OF THE DRAWINGS

The accompanying drawings, which are incorporated in and form a part of this specification, illustrate embodiments of the invention and together with the description, serve to explain by way of example only, the principles of the invention:

FIG. 1 is a schematic depiction of diver's aid.

DETAILED DESCRIPTION OF THE PREFERRED EMBODIMENTS

As will be appreciated the present invention is capable of other and different embodiments than those discussed above and described in more detail below, and its several details are capable of modifications in various aspects, all without departing from the spirit of the invention. Accordingly, the drawings and description of the embodiments set forth below are to be regarded as illustrative in nature and not restrictive.

FIG. 1 shows the sectional view of the diver's aid 100. The body shape in FIG. 1 is round but could be any other shape considered practical for optimal functioning. Its material could be plastic or other suitable materials.

The heat conductor 102 could be any material suitable to be exposed to the conditions under water and efficiently conduct heat. The thermistor 106 could be attached to the heat conductor 102 by the heat sensors 104. The heater 108 would heat the heat conductor 102 with a constant heat. The water current is indicated by direction arrows 110. The diver's aid device would be kept facing as close as possible into the direction of the water flow direction with the aid of the directional and balancing wings or fins 112. There could be at least one wing 112 and at least one wing 114 placed perpendicularly to the wing 112.

As the water current 110 flows onto the heat conductor 102 it will cool the heat conductor 102. The stronger the water flow the greater the effect of the cooling. This change in temperature is recorded by the heat sensors 104 of the thermistor 106 causing changes in the electric current in the thermistor 106, the said current being sent to the microprocessor 116. In this way the speed of the water flow is calculated by a formula that converts the electric current change into water flow speed.

The thermometer 118 measures the water temperature and the result is transferred digitally to the micro-processor 116. The cable 120 is used for holding the diver's aid 100 in the water at the required depth. It could be marked 122 at regular intervals so that the depth could be observed on the cable 120.

The magnetic directional sensors 124 placed perpendicularly one to the other would record their readings and send them to the micro-processor 116. This directional reading would show the direction of the diver's aid 100 and hence the direction of the water current.

Weights 126 could be attached to the lower portion of the diver's aid 100 to help keep the driver's device 100 in the upright position and to ensure that the device's 100 weight is more than the volume of water it displaces. This way the driver's device 100 remains submerged until pulled to the surface.

The micro-processor 116 could send the results of these tests to the boat on the surface of the water. These results could include water temperature at the measured depth, the strength of the water current and the direction of the current relative to north, for example. The depth of the said measurements could be read by a person on the boat according to the markings 122 on cable 120. If the depth reading is measured electronically that detail could be added to the other details in the micro-processor 116.

What is claimed:

1. A method for measuring the strength of an under-water current comprising the following steps;
   a. placing the measurement device under water at the desirable depth, said measurement device comprising
      i. a micro-processor
      ii. a thermistor connected to said micro-processor,
      iii. a thermometer, to measure the temperature of the water, connected to the said micro-processor, said thermometer might be separated from said thermistor or alternatively, said thermistor might also carry out the function of said thermometer,
      iv. a heat conductor exposed to said water current and connected to said thermistor by heat sensors,
      v. a heater to provide a constant heat supply to said heat conductor,
      vi. designated software for calculating all input data transferred to said micro processor and producing the output data,
   b. said thermometer measures the temperature of the water and transfer data to said processor,
   c. said thermistor measures the temperature of said heat conductor and transfer data to said processor,
   d. said heater heats the said heat conductor to a constant heat,
   e. after a fixed time, said thermistor measures the temperature of said heat conductor that is affected from said under-water current, and transfer data to said micro processor
   f. said micro-processor calculating all input data, obtained by steps b to e, and produces the output data, said output data includes the strength of water current, said strength of water current is obtained mainly from the difference in the temperature of the heat conductor affected from said under water current, the stronger the current the faster would be the drop in the temperature.

2. A method and device for measuring the strength of an under-water current as claimed in claim 1, wherein said device further comprising at least one directional balancing wing thereby keeping the said heat conductor facing the oncoming flow of water current.

3. A method and device for measuring the strength of an under-water current as claimed in claim 1, wherein said device further comprising a cable to enable the said device to be lowered into the water to the desired depth and raised out of the water when desired to remove.

4. A method and device for measuring the strength of an under-water current as claimed in claim 3 wherein the said cable is marked at regular intervals so that the depth of the said device in the water can be recorded.

5. A method and device for measuring the strength of an under-water current as claimed in claim 1, wherein said device further comprising a weight placed in the said device to ensure the total weight of the said device is greater than the weight of the water the said device displaces.

6. A method and device for measuring the strength of an under-water current as claimed in claim 1 wherein said device further comprising at least one direction sensor connected to the said micro-processor.

7. A method and device for measuring the strength of an under-water current as claimed in claim 6, wherein there are two directional sensors being placed perpendicularly one from the other thereby recording the "X" and "Y" axes.

8. A method and device for measuring the strength of an under-water current as claimed in claim 1 wherein said output data further includes at least one of the following
   a. the direction of the said water current
   b. a danger level of diving in those waters at the depth measured based on a scale of danger levels
   c. a recommendation of the distance a diver should be from the base boat for safe diving.

9. A method for measuring the strength of an under-water current comprising the following steps;
   a. placing the measurement device under water at the desirable depth, said measurement device comprising
      i. a micro-processor
      ii. a thermistor connected to said micro-processor,
      iii. a thermometer, to measure the temperature of the water, connected to the said micro-processor, said thermometer might be separated from said thermistor or alternatively, said thermistor might also carry out the function of said thermometer,
      iv. a heat conductor exposed to said water current and connected to said thermistor by heat sensors,
      v. a heater to provide a constant heat supply to said heat conductor, vi. at least one direction sensor connected to the said micro-processor,
vii. at least one balancing wing, keep its direction constant relative to the flow of the water current,
viii. weight in or attached to the said device to keep the lower portion of the said device at a lower level than the rest of the said device,
ix. a cable attached to the said device to lower and raise the said device into and out of the water,
x. designated software for calculating all input data transferred to said micro processor and produce the output data, b. said thermometer measures the temperature of the water and transfer data to said processor, c. said thermistor measures the temperature of said heat conductor and transfer data to said processor, d. said heater heats the said heat conductor to a constant heat, e. after a fixed time, said thermistor accurately measures the changes of temperature in said heat conductor and transfer data to said micro processor, f. said micro-processor calculating all input data and produce the output data, said output data includes at least one of the following
  i. the strength of water current,
  ii. the direction of the said water current flow,
  iii. a danger level of diving in those waters at the depth measured based on a scale of danger levels,
  iv. a recommendation of the distance a diver should be from the base boat for safe diving.

* * * * *